Figure 1:
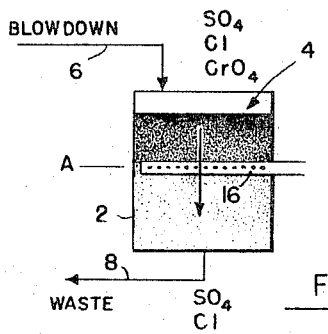

INVENTORS
LOUIS SLOAN
NICHOLAS NITTI &
JACK B. PRATT

BY

ATTORNEYS

United States Patent Office 3,306,859
Patented Feb. 28, 1967

3,306,859
METHOD AND APPARATUS FOR FLUID TREATMENT
Louis Sloan and Nicholas J. Nitti, Philadelphia, Pa., and Jack B. Pratt, Millside Heights, N.J., assignors to Crane Co., Chicago, Ill., a corporation of Illinois
Filed Dec. 31, 1963, Ser. No. 338,554
14 Claims. (Cl. 252—387)

This application is in part a continuation of our application Serial Number 289,890, filed June 24, 1963, now abandoned.

This invention relates to methods and apparatus for fluid treatment by ion exchange and has particular reference to recovering of materials which have been absorbed by an ion exchange material. While the invention is of more general applicability, it will be convenient herein to refer consistently to its use in a particular typical system in which its advantages are outstanding. Such a system is one for recovery of chromate ions from the blow down of a cooling system involving cooling towers.

In the case of air conditioning or other cooling systems, water is used to absorb heat and is then passed to cooling towers in which cooling is effected by evaporation of a portion of the water. To minimize corrosion chromate ions are added to the recirculating water usually in the form of sodium chromate or chromic acid. Because of the fact that evaporation takes place during operation, the salts present in the water which is used become concentrated, and to limit the concentration it is necessary to blow down the system either continuously or intermittently, bleeding off portions of the water which are then replaced by makeup. The blow down has been wasted to the sewer, but this has two major objections: first, the expensive chromate ions are thus lost, and second, the chromate ions represent a pollution problem and are in some cases required to be removed but in such fashion that recovery is impractical from the standpoint of cost. Removal by ion exchange has been used, but has been carried out in expensive fashion. A typical blow down may include twenty to several hundred parts per million of chromate ion, $CrO_4$. Disregarding cations, the chromate ions may be accompanied by, typically, 900 parts per million of sulphate ions, 300 parts per million of chloride ions and 15 to 20 parts per million of phosphate ions.

It is the general object of the present invention to effect economical recovery of such valuable materials as the chromate ions just referred to. Chromate ions involve a characteristic in their absorption by an anion exchange resin which is also exhibited by various other materials to which the invention is applicable. When a solution containing these anions is passed through a bed of anion exchange resin, it is found that a high concentration of the ion on the resin occurs near the inlet portion of the bed. If the exchange is carried out in conventional fashion, and regeneration is attempted by flow of regenerant through the entire bed, it is found that the ions displaced at the inlet portion of the bed are reabsorbed in later portions of the bed with the result that a migration, in effect, takes place with a general dispersion of the ions through the bed. The resulting lower concentration thus produced through the bed requires the use of regenerant in considerably more than the stoichiometric amount required. The result is that the effluent will contain an undue amount of excess regenerant. Specifically applied to the recovery of chromate ion, this means that the effluent would contain an excessive amount of a regenerant such as sodium sulphate, so that the effluent could not be returned to the cooling system.

In accordance with the present invention, a process and apparatus is provided giving rise to an effluent rich in chromate ions and relatively poor in regenerant ions so that it is acceptable for return to the cooling system.

At this point it may be noted, preliminarily, that for simplicity of disclosure of procedural steps chromate ions, $CrO_4$, will be first referred to consistently; but anticipating what will be said more fully later, the references to chromate ions apply equally to bichromate ions, $HCr_2O_7$. Also, where regeneration with salts, e.g. sodium sulphate or sodium chloride is referred to without reference to increased alkalinity, there may be borne in mind the fact that the regenerant may advantageously contain alkali, as will be subsequently brought out more fully.

Figure 5:
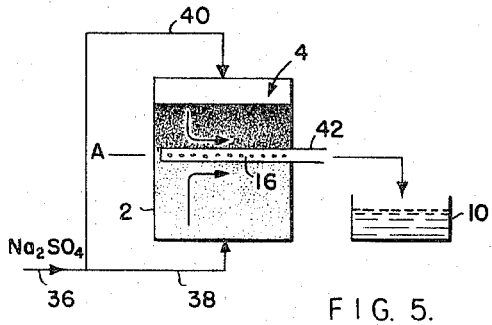
Figure 6:
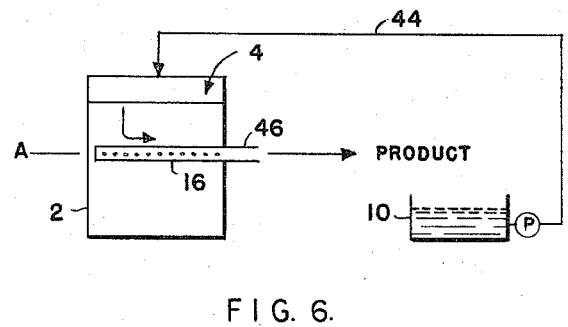

The foregoing indicates the general objects of the invention directed to recovery of a satisfactory effluent containing materials of value, and these objects together with others relating to details of operation will become more apparent from the following description, read in conjunction with the accompanying drawing, in which:

FIGURES 1 to 4, inclusive, indicate diagrammatically apparatus and steps of a process provided in accordance with the invention;

FIGURES 5 and 6 similarly indicate apparatus and steps of a modified process; and FIGURES 7 to 10, inclusive, similarly show still another modification of the apparatus and process.

Referring to FIGURES 1 to 4, inclusive, the apparatus and steps will now be described pertaining specifically to the recovery of chromate ions.

FIGURE 1 illustrates the conditions achieved by onstream operation of an anion exchanger which is indicated as comprising a conventional tank 2 which contains a bed of strong anion exchange resins 4, such as Nalco SBR or Rohm and Haas IRA400. A very large variety of anion exchange resins may be used and hence it is considered unnecessary to specify the resins in detail, the resins being commercially well known. In the onstream operation, the blow down from a cooling system enters the upper part of the exchange unit at 6. This blow down may contain, as indicated in FIGURE 1, as anions, $SO_4$, $Cl$ and $CrO_4$, together with possible other anions such as $PO_4$. It may be here remarked that for regeneration sodium sulphate or sodium chloride may be used; but for consistency of description, it will be hereafter assumed that sodium sulphate is used as the regenerant. Other anions may, of course, occur. The blow down material after passing through the exchanger is wasted at 8. The removal of chromate ions will be essentially complete if operation is carried out in accordance with good practice, with an adequate bed to take care of the flow and with regeneration effected at proper intervals, so that the waste will contain only harmless anions which may be discharged into a sewer.

In this exchange operation since the resin will have a strong affinity for the chromate ions, conditions exist at the time when regeneration is indicated which may be generally visualized from the stippling in FIGURE 1 representing the concentration of absorbed chromate ions. It will be found, for example, that at the time when the bed may be considered effectively exhausted, the major concentration of absorbed chromate ions will be in the inlet portion of the bed, with the greater part of these ions concentrated, for example, in the upper third of the bed. Above the level indicated at A, for example, the concentration of chromate ions in the richest portion of the zone may be of the order of 3.5 pounds per cubic foot of the resin. Below this level A, the concentration decreases rapidly and when the bed may be considered exhausted the concentration of chromate ions in the lower portion may be of the order of 0.5 pound per cubic foot.

At this point there may be considered what would occur if regenerant, sodium sulphate, was introduced at the top of the bed and caused to flow therethrough. The chromate ions in the upper portion of the bed would be well displaced, but in flowing through the lower portion of the bed they would be reabsorbed and diffusely distributed at lower average concentration. In view of this lower concentration, considerably more of the stoichiometric amount of sodium sulphate would be required to effect satisfactory regeneration, and the effluent, therefore, would contain a high proportion of sulphate ions with respect to the chromate ions. The resulting effluent, therefore, would not be satisfactory for return as makeup of chromate ions to the cooling system, requiring a greater amount of blow down in view of the greater concentration of solutes.

Figure 2:
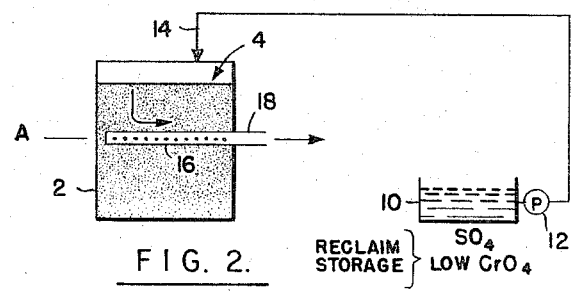

In accordance with the invention, the first step of regeneration of the bed is that illustrated in FIGURE 2. A storage tank 10 is provided, designated herein as the reclaim storage, containing a solution which is produced during continuous operation as set forth hereafter. This solution may typically contain, in water, about 3.5% of sodium sulphate and about 0.3% of chromate ion. Its chromate ion content is sufficiently low that it is quite effective as an initial regenerant of the heavily loaded portion of the anion exchange resin. The solution from the tank 10 is forced by a pump 12 into the upper portion of the container 2 as indicated at 14. However, it is not caused to flow through the entire bed 4 but is discharged through a collector 16 at 18, the effluent at 18 being the product which may be directly returned to the cooling system together with added makeup water. This product may contain, typically, about 2.5% sodium sulphate and 0.8 to 1.0% chromic ions. In this first regenerating step, the lower portion of the bed 4 will not be regenerated. The receiving system 16 is desirably located at or approximately the level A at which, as previously described, the upper band of high concentration of absorbed chromate ions terminates. The system 16 may be of the conventional type used to permit the passage of liquids but prevent the exit of the resin particles, such as a series of connected pipes covered with screens, or the like. What is novel in the present instance for carrying out the regeneration is that this collector system is located at a level such as indicated in addition to top and bottom distributors to secure the described operations.

(It may be here noted that the apparatus used and its connecting piping will involve the elements required for the various flows which have been and will be described with reference to FIGURES 1 to 4, inclusive. For clarity of illustration the obvious valving, etc., are not shown in full in each figure, it being understood, for example, that the inlets 6 and 14 with respect to a liquid distributor may be the same, and that the outlet at the bottom of the tank shown at 8 in FIGURE 1 will have the usual system to provide liquid flow but prevent outflow of the resin, and may function as hereafter indicated for inlet as well as outlet.)

The regeneration of the upper portion of the bed carried out as just described will leave in the upper portion a small amount of absorbed chromate ions, and the final concentration in this portion of the bed may be of the same order as that involved in the lower portion.

The next step is the regeneration of the entire bed as will now be described with reference to FIGURE 3. In this regeneration sodium sulphate solution, 2 to 5%, without chromatic ions, is introduced at 20 and the stream is split with part entering at 22 the bottom of the bed while another part enters at 24 the upper part of the bed. These both may be proportioned by suitable valves in accordance with the amounts of chromatic ions in the respective upper and lower portions of the bed, outflow being provided through the outflow connections at 16 to provide at 26 an effluent to the reclaim storage tank 10 previously mentioned. Here the outflow is essentially that previously described, though possibly more concentrated in both sulphate and chromate ions in view of subsequent dilutions, at least from the standpoint of chromate ions by the next step of the process. By the operation illustrated in FIGURE 3, the bed and particularly its lower portion is swept substantially free of chromate ions. In particular, the regeneration is carried out so that at least the lower portion of the bed is rendered quite clean of absorbed chromate ions so that when the bed is again put back in on-stream operation it will be effective to remove substantially all chromate ions.

Figure 3:
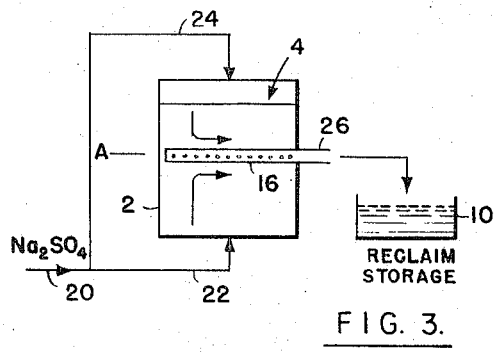
Figure 4:
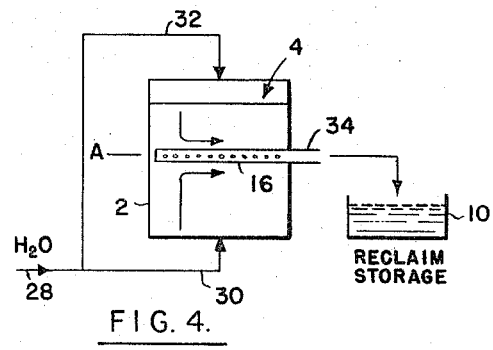

Next, the bed is washed as indicated with reference in FIGURE 4. The same flow connections are provided as in FIGURE 3, but water is now introduced at 28 and is split into separate streams 30 and 32 respectively entering the bottom and top of the bed, with outflow through the outflow connections 16 as indicated at 34, the outflow at 34 being essentially of sodium sulphate solution which may be directed into the reclaim storage tank 10.

Conventional backwashing by upflow through the entire bed may effected.

It may be noted that the flow at 24 in FIGURE 3, may be held low, merely providing a barrier so that the flow into the bottom of the resin container will be forced outwardly through the outlet connections 16. In other words, in FIGURE 3 there may be no substantial further regeneration of the upper portion of the bed.

The advantages of what has now been described will be apparent. In the regeneration step of FIGURE 3, the low concentration of chromate ions in the bed requires substantially more than the stoichiometric amount of the regenerant for its removal. But the effluent from the stage containing the excess regenerant is fairly effective for regeneration of the upper portion of the bed as in FIGURE 2. The result is the product containing a high concentration of chromate ions without an unduly high amount of regenerant so that this product may be used directly in the cooling system, returning thereto substantially all of the chromate ions and thus minimizing the necessity for makeup of the chromate content in the cooling system.

As already indicated, sodium chloride or other regenerant may be used as well as sodium sulphate, and what has been said concerning sodium sulphate would be equally true as to concentration of sodium chloride or the like.

As another alternative, backwashing may be effected, instead of that described in FIGURE 4, of only the upper portion of the bed, in which case water may be introduced through connections 16 with effluent from the top of the bed flowing to waste.

Before use of the reclaimed material in tank 10 in the procedure of FIGURE 2, the reclaimed solution may, of course, be altered, as by the addition of sodium sulphate or otherwise to put it in an optimum condition for regeneration of the upper portion of the bed.

The reclaimed regenerant may be split into successive fractions. The first obtained may be sufficiently rich in chromate ions to be returned directly to the cooling system; while a later fraction, rich in regenerant, may be used as in FIGURE 2.

It is known that hexavalent chromium may be more effectively removed as monovalent dichromate ions, $HCr_2O_7$, than as bivalent chromate ions, $CrO_4$, the former requiring only one site of the resin and the latter two sites. This involves operation under acidic conditions and these concurrently make available more sites for the exchange by converting the held bivalent sulphate, $SO_4$, ions to monovalent bisulphate, $HSO_4$, ions. Accordingly, it is advantageous to have the inflowing blowdown (FIGURE 1) sufficiently acidic to achieve these conditions. These may be achieved in several alternative ways:

First, the blowdown water from a cooler normally having a pH range of 6.0 to 7.0 and usually insufficiently acidic to attain the desired conditions, acid (e.g. sulphuric) may be added to the influent to the ion exchanger so that the influent has a pH in the range 4.8 to 5.5, sufficient to cause the exchange to involve primarily dichromate ions, rather than chromate ions, and also to convert held sulphate ions to bisulphate ions, making available more sites for chromate absorption. The latter condition may be further promoted by running dilute acid (e.g. sulphuric) through the resin prior to the entry of the acidified blowdown. The addition of the acid to the influent may be continuous or intermittent with substantially equivalent results. The amount of acid added is not critical; however, a pH range as stated above has been found to be optimum.

Another alternative to acid introduction is to pass a portion of the blowdown through a preliminary cation exchange bed to introduce sufficient H+ to depress the pH to the desired level.

Precisely what occurs may well not be in accordance with what is stated simply above; but it is the fact that more strongly acidic chromate influent does have its chromium content substantially more effectively removed than a neutral or less acidic influent. Under the acid conditions the "banding" of the chromate concentration occurs just as previously described, so that the procedure and its advantages are the same.

The foregoing considerations also lead to a desirable modification of the regeneration from the use of a neutral salt alone: i.e., regeneration involving the use of alkali as well as salt. The use of alkali reverses the chromate-dichromate conversion requiring more resin sites for holding chromium and making the ions more readily removed.

Two regeneration alternatives may be adopted:

In the first alternative, dilute NaOH, e.g. 1% to 2% concentration, may be first passed through the bed as in FIGURE 3. The effluent may be delivered to the reclaim storage 10, though if desired the initial effluent, which contains little chromium and is rather strongly alkaline, may be run to waste so as not to render too alkaline the ultimate product (of FIGURE 2) to be returned to the cooling system. The regenerant salt will then follow the alkali and the effluent, relatively low in alkali content, may pass to the reclaim storage as already described with reference to FIGURE 3.

In a second alternative, the alkali may be added to the regenerant salt solution for the step of FIGURE 3.

In either of the foregoing alternatives the pH of the alkali-salt regenerant should be high enough to provide phenolphthalein alkalinity (8.3 or higher).

Procedural sequences other than that of FIGURES 1 to 4 will now be described and for simplicity of description there will again be continued consistent references to chromate ions; but it will be evident that in all cases the steps may involve the treatment of blow down rendered acidic and/or of regenerant rendered alkaline as has been described.

Another procedure which may be used is shown in FIGURES 5 and 6. Referring to FIGURE 5, the bed is shown as in FIGURE 1 at the termination of the chromate ion removal cycle with the concentrated chromate ion at the upper portion of the bed. Fresh regenerant (sodium sulphate) is introduced at 36 and is split into the two flows 38 and 40 respectively entering the bottom and top of the bed. These two flows may be proportioned by valves in accordance with the particular results desired. Both flows are removed through the outlet connections 16 located, as before, below the highly concentrated region. The outflow 42 passing to the reclaim storage tank 10 now may contain a higher concentration of chromate ions than in the case of the previously described reclaimed material, due to the fact that the fresh regenerant regenerates in part the upper portion of the bed. However, the outflow thus obtained is still effective for further regeneration of the uppermost portion of the bed as indicated in FIGURE 6 wherein the reclaimed material is now pumped at 44 into the top of the bed and passes outwardly through the outlet connection 16 at 46 to provide the product containing concentrated chromate ions. This product is thus suitable for return to the cooling system.

The flow 44 may be followed by fresh regenerant, the effluent either going to the reclaim tank or, if it contains sufficient chromate ions, to the cooling system.

The procedure shown in FIGURE 6 may be followed by a rinsing operation with water as shown in FIGURE 4, the washed out sodium sulphate solution being passed to the reclaimed storage tank though it may also be added as at 36 in FIGURE 5 to additional sodium sulphate.

In view of the fact that the regeneration of the ion exchange material containing a high concentration of chromate ions may take substantial time, it may be desirable to remove this portion of the ion exchange material from the bed rather than to regenerate it in situ. The proceduce involved in doing this is shown in FIGURES 7 to 10, inclusive.

Figure 7:
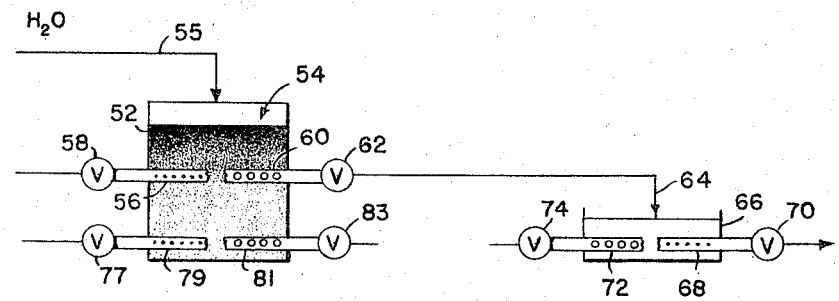
Figure 8:
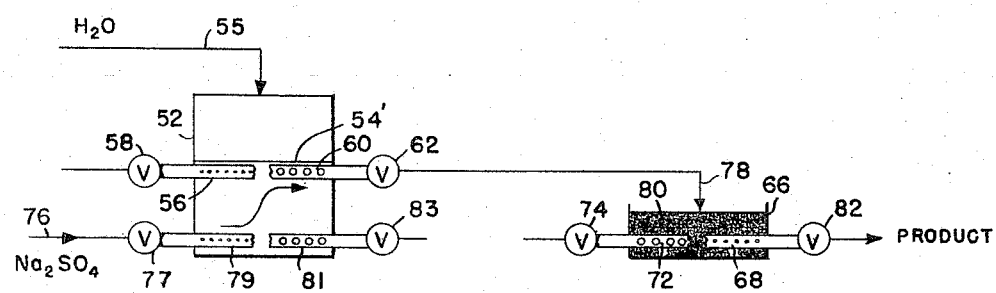
Figure 9:
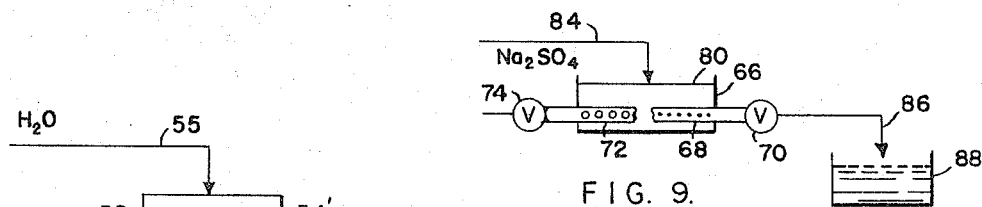

The ion exchange vessel 52 contains the bed 54. FIGURE 7 assumes that the bed, previously operated as shown in FIGURE 1, has reached the stage when regeneration is desirable.

The vessel 52 is in this case provided with distributors and receivers of two types: At the level below the region of high concentration of absorbed chromate ions, i.e. corresponding to the level A of FIGURE 1, there are provided the distributors 56 and 60, while at the bottom of the vessel there are provided the distributors 79 and 81. These are shown as subject to flow control therethrough by the valves 58, 62, 77 and 83, respectively. The distributors 56 and 79 are provided with small openings, as by a mesh covering, which will permit the flow of liquid but block the passage of resin particles. On the other hand, the distributors 60 and 81 are provided with large openings through which the particles may pass to leave the vessel or to be restored thereto.

In the operation illustrated in FIGURE 7, water enters at 55 and with valve 62 open the portion of the ion exchange material above the distributor 60 is washed out to pass at 64 to a treating tank 66. This last tank is also provided with a pair of distributors 72 and 68, controlled by the respective valves 74 and 70. The distributor 68 is provided with small openings permitting liquid passage but blocking passage of resin particles, while the distributor 72 is provided with large openings for passage of the resin particles. By the action just described, all or part of the upper portion of the bed above distributor 60 is washed into the tank 66 and with valve 70 opened the wash water may be directed to waste. The upper portion of the bed is thus located in the vessel 66.

With valves 77, 62 and 82 opened, the remaining illustrated valves being closed, fresh regenerant such as sodium sulphate solution is introduced at 76 and through the distributor 79, whence it flows upwardly through the lower portion of the bed and out through distributor 60 and valve 62 to be delivered at 78 to the top of the bed in vessel 66 through which it then flows downwardly and passes out of the distributor 68 through valve 82 to constitute the product returnable to the cooling system. In the passage through the remaining lower portion of the bed in vessel 52 the regenerant will remove the chromate ions from the bed, but in view of the relatively low concentration it is still capable of regeneration of the material within the vessel 66 and leaves the latter in the form of a concentrated chromate ion solution with relatively low excess regenerant.

Since the regeneration of the material in vessel 66 may not be complete, it may be desirable to follow the last operation by additional regeneration of the material at 80 by the introduction of additional regenerant at 84, the effluent being directed at 86 into a temporary reclaim vessel 83 which will thus receive a solution lower in chromate ions and with a considerable excess of regenerant. This reclaimed solution may be used in various fashions as for the first part of the flow introduced at 76 in FIGURE 8.

Figure 10:
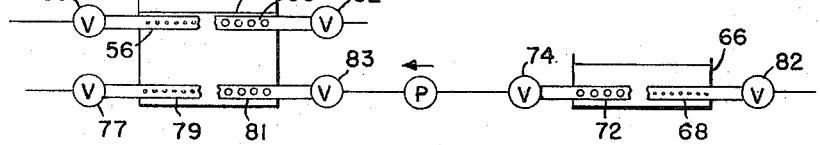

Finally to restore the system to on-line operation, the procedure illustrated in FIGURE 10 is carried out, with valves 74 and 83 opened and the remaining valves closed, a pump 90 is used to remove the material 80 from the vessel 66 to force it into the lower portion of the vessel 52 restoring the bed to an operative condition. In order to avoid disturbance of the upper portion of the bed water pressure may be introduced at 55. The ion exchange material introduced to the bottom of the bed is now quite clean so that when the ion exchanger is again put into operation this portion of the bed will be effective to remove last traces of the chromate ions.

While the process has been described specifically with respect to the recovery of chromate (or dichromate) ions, it will be evident that it is of broader applicability and may be used for the recovery of other ions of value, being particularly useful when, as is often the case, concentration of ions occurs in a particular portion of the bed. Under some conditions this concentration may occur primarily between the upper and lower portions of the bed, in which case obvious modifications may be provided to secure the special regeneration of the portions of the bed containing the high concentration; i.e., sets of distributors above and below the portion of the bed in question may provide flow selectively through that portion of the bed with little or no action on other portions, and the latter portions may be selectively treated to the exclusion of the portion containing the highly concentrated material.

While with specific respect to treatment of water in a cooling system the recovery of chromate ions has been described, phosphate ions are sometimes intentionally added along with chromate ions and recovery of the phosphate ions is also desirable. When phosphate ions thus accompany chromate ions they may be absorbed by the ion exchange material along with the chromate ions, and the procedures described are fully applicable to this dual recovery. The phosphate ions may not, and ordinarily will not, separate in the same portion of the bed as the chromate ions; rather, usually, the chromate ions, for which the bed has a greater affinity, will separate first and then, further along the bed, the phosphate ions will separate. But since both constituents are used concurrently, they need not be separated from each other, and consequently that region of the bed which contains a high concentration of both chromate and phosphate ions, even though they are separated to some extent from each other, may be treated in the same fashion as the concentrated chromate ion region described in the several examples discussed above. It will be obvious, of course, that the region or zone just mentioned may have its two portions treated separately to secure two products, one containing predominantly chromate ions and the other predominantly phosphate ions, the type of apparatus described above being provided with a pair of distributors at different levels rather than the single distributor such as 16 or the composite distributor arrangement 56, 60 of FIGURES 7 to 10, inclusive. It will be understood that where reference is made to an absorbed ionic material this will include either one ionic material or a plurality.

At this point it may be mentioned that it is sometimes advantageous to precede a treatment with the major regenerant such as sodium sulphate with a relatively ineffective partial regenerant such as water having a suitable pH. For example, consider the step illustrated in FIGURE 2. This may be preceded by flow through the same path illustrated thereat but involving water entering at 14 passing out at 18 to provide a product returnable to the cooling system. Slightly acidulated water, i.e. containing a small amount of sulfuric acid, will remove some chromate ions from the upper concentrated zone of the bed, thus lessening the required action of the material from the tank 10. The addition of this water and a slight amount of acid is not detrimental because water must be added for makeup in any event and the cooling system is usually desirably kept slightly acidic. On the other hand, this will somewhat lessen the accumulation of solids in the system for which blow down is required.

While the foregoing particularly streses anion exchange, it will be evident that the invention is equally applicable to the recovery of cations in which case the bed would be formed of a cation exchange material. Thus valuable cationic metals may be recovered and particularly in concentrations which may permit their direct re-entry into some main treatment system.

Separation of anions (or cations) may also be effected. For example, different metals such as iron and copper will generally separate in stratified form in a bed, iron being first absorbed and then copper. Choosing suitable location of a distribution system, substantial degrees of separation of such materials may be effected. In some cases, of course, the effluent which has been heretofore referred to as the product may be a component to be discarded rather than used.

In cases of multivalent ions, controls of the valence states in both absorption and regeneration may be effected in the same types of fashions as discussed above for chromate-dichromate changes by controls of pH.

In the following claims it is to be understood that references to chromate ions include dichromate ions.

In view of the foregoing it will be understood that the invention is not to be considered as limited except as required by the following claims.

What is claimed is:

1. The method of recovering absorbed ionic material from an ion exchange bed in which there are at least two zones, a first of which contains a high concentration of the absorbed ionic material, and a second of which contains a lower concentration of the same absorbed ionic material, said method comprising the steps of at least partially regenerating the second zone with a liquid having a low concentration of the ionic material of the type absorbed, and of at least partially regenerating the first zone with a liquid having a higher concentration of the ionic material of the type absorbed resulting from the at least partial regeneration of a second zone of the type specified.

2. The method according to claim 1 in which said ionic material is chromate and phosphate ions.

3. The method according to claim 1 in which the two zones are parts of a single bed through which liquid containing said ionic material had been passed in series during an absorption process, and in which method said regenerating steps are carried out with said zones in the positions occupied during the absorption process.

4. The method according to claim 3 in which said ionic material is chromate ions.

5. The method according to claim 1 in which the two zones were parts of a single bed through which liquid containing said ionic material had been passed in series during an absorption process, and in which method at least one of said regenerating steps is carried out with said first zone regenerated in the last mentioned step removed from the bed, and including the further step of returning said zone to the bed.

6. The method according to claim 5 in which the zone so removed is returned to the bed in a different position therein.

7. The method according to claim 5 in which said ionic material is chromate ions.

8. The method according to claim 1 in which said ionic material is chromate ions.

9. The method according to claim 8 in which the regeneration is effected by the use of alkali and a salt of an alkali metal followed by a strong acid.

10. The method of recovering absorbed ionic material from an ion exchange bed in which there are at least two zones, a first of which contains a high concentration of the absorbed ionic material, and a second of which contains a lower concentration of this same ionic material, said method comprising the steps of at least partially regenerating the first zone with a liquid having a low concentration of the ionic material of the type absorbed, followed by further regeneration of both first and second zones with another liquid also having a low concentration of the ionic material of the type absorbed.

11. The method according to claim 10 in which the two zones are parts of a single bed through which liquid containing said ionic material had been passed in series during an absorption process, and in which method said regenerating steps are carried out with said zones in the positions occupied during the absorption process.

12. The method according to claim 10 in which the liquid regenerating both the first and second zones contains a highly ionized salt.

13. The method according to claim 10 in which said ionic material is chromate ions.

14. The method according to claim 13 in which the regeneration is effected by the use of alkali and a salt of an alkali metal followed by a strong acid.

References Cited by the Examiner

UNITED STATES PATENTS

| | | | |
|---|---|---|---|
| 2,733,204 | 1/1956 | Costa | 210—30 |
| 3,002,815 | 10/1961 | Heinze | 23—145 |

MORRIS O. WOLK, *Primary Examiner.*

E. G. WHITBY, *Assistant Examiner.*